(12) United States Patent
Bobbitt et al.

(10) Patent No.: US 9,299,229 B2
(45) Date of Patent: Mar. 29, 2016

(54) DETECTING PRIMITIVE EVENTS AT CHECKOUT (75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1097 days.

(21) Appl. No.: 12/325,177

(22) Filed: Nov. 29, 2008

(65) Prior Publication Data
US 2010/0134624 A1 Jun. 3, 2010

(51) Int. Cl.
H04N 7/18 (2006.01)
G07G 3/00 (2006.01)
G06Q 20/20 (2012.01)
G07G 1/00 (2006.01)
G08B 13/196 (2006.01)
G06Q 20/40 (2012.01)
G07F 19/00 (2006.01)

(52) U.S. Cl.
CPC ............ *G07G 3/00* (2013.01); *G06Q 20/203* (2013.01); *G06Q 20/206* (2013.01); *G06Q 20/208* (2013.01); *G06Q 20/4016* (2013.01); *G07F 19/20* (2013.01); *G07F 19/207* (2013.01); *G07G 1/0054* (2013.01); *G07G 1/0063* (2013.01); *G07G 3/003* (2013.01); *G07G 3/006* (2013.01); *G08B 13/19613* (2013.01)

(58) Field of Classification Search
CPC .......... G08B 13/19613; G07G 1/0054; G07G 1/0063; G07G 3/00; G07G 3/003; G07G 3/006; G06Q 20/4016; G06Q 20/203; G06Q 20/206; G06Q 20/208
USPC .......................................... 348/150
See application file for complete search history.

(56) References Cited

U.S. PATENT DOCUMENTS

| 4,237,483 A * | 12/1980 | Clever .................... 348/150 |
| 4,991,008 A | 2/1991 | Nama |
| 5,609,223 A * | 3/1997 | Iizaka et al. ............. 186/61 |
| 5,745,036 A | 4/1998 | Clare |
| 5,747,784 A * | 5/1998 | Walter et al. ............. 235/383 |

(Continued)

FOREIGN PATENT DOCUMENTS

| WO | WO/02/45434 | 6/2002 |
| WO | WO/03/045070 | 5/2003 |
| WO | WO/2006/105376 | 10/2006 |

OTHER PUBLICATIONS

Moeslund, et al., "A survey of advances in vision-based human motion capture and analysis," Computer Vision and Image Understanding, pp. 90-126, 2006.

(Continued)

*Primary Examiner* — Blake Rubin
(74) *Attorney, Agent, or Firm* — Patterson & Sheridan, LLP (57) ABSTRACT Techniques for detecting one or more events are provided. The techniques include identifying one or more segments in a video sequence as one or more candidates for one or more events by a temporal ordering of the one or more candidates, and analyzing one or more motion patterns of the one or more candidates to detect the one or more events.

21 Claims, 6 Drawing Sheets

(56) References Cited

U.S. PATENT DOCUMENTS

| | | | |
|---|---|---|---|
| 5,883,968 A * | 3/1999 | Welch et al. | 382/100 |
| 5,953,055 A * | 9/1999 | Huang et al. | 348/155 |
| 5,965,861 A * | 10/1999 | Addy et al. | 235/383 |
| 5,969,755 A | 10/1999 | Courtney | |
| 6,056,087 A * | 5/2000 | Addy et al. | 186/61 |
| 6,075,560 A | 6/2000 | Katz | |
| 6,236,736 B1 * | 5/2001 | Crabtree et al. | 382/103 |
| 6,263,088 B1 * | 7/2001 | Crabtree et al. | 382/103 |
| 6,424,370 B1 | 7/2002 | Courtney | |
| 6,606,408 B1 * | 8/2003 | Kang et al. | 382/164 |
| 6,636,635 B2 | 10/2003 | Matsugu | |
| 6,847,393 B2 | 1/2005 | Ashe et al. | |
| 7,004,382 B2 * | 2/2006 | Sandru | 235/379 |
| 7,004,383 B2 | 2/2006 | Graef et al. | |
| 7,080,778 B1 | 7/2006 | Kressin et al. | |
| 7,100,824 B2 | 9/2006 | Ostrowski et al. | |
| 7,246,745 B2 | 7/2007 | Hudnut et al. | |
| 7,319,479 B1 | 1/2008 | Crabtree et al. | |
| 7,448,542 B1 | 11/2008 | Bobbitt et al. | |
| 7,503,490 B1 | 3/2009 | Bobbitt et al. | |
| 7,516,888 B1 * | 4/2009 | Kundu et al. | 235/383 |
| 7,631,808 B2 | 12/2009 | Kundu et al. | |
| 7,646,745 B2 | 1/2010 | Caldwell et al. | |
| 7,646,887 B2 * | 1/2010 | Goncalves et al. | 382/103 |
| 7,664,292 B2 * | 2/2010 | van den Bergen et al. | 382/103 |
| 7,688,349 B2 | 3/2010 | Flickner et al. | |
| 7,822,252 B2 | 10/2010 | Bi et al. | |
| 7,957,565 B1 | 6/2011 | Sharma et al. | |
| 7,962,365 B2 | 6/2011 | Bobbitt et al. | |
| 8,244,012 B2 | 8/2012 | Liang et al. | |
| 8,253,831 B2 | 8/2012 | Bobbitt et al. | |
| 8,267,316 B2 | 9/2012 | Ostrowski et al. | |
| 8,448,858 B1 * | 5/2013 | Kundu et al. | 235/383 |
| 8,448,859 B2 * | 5/2013 | Goncalves et al. | 235/383 |
| 8,459,545 B1 | 6/2013 | Hammer et al. | |
| 8,833,653 B2 * | 9/2014 | Kundu et al. | 235/383 |
| 2002/0044691 A1 | 4/2002 | Matsugu | |
| 2002/0096564 A1 * | 7/2002 | Bellis et al. | 235/383 |
| 2003/0107649 A1 | 6/2003 | Flickner et al. | |
| 2003/0174869 A1 | 9/2003 | Suarez | |
| 2004/0066966 A1 | 4/2004 | Schneiderman | |
| 2004/0066970 A1 | 4/2004 | Matsugu | |
| 2004/0155960 A1 * | 8/2004 | Wren et al. | 348/150 |
| 2004/0190092 A1 * | 9/2004 | Silverbrook et al. | 358/539 |
| 2005/0141765 A1 | 6/2005 | Liang et al. | |
| 2005/0146605 A1 | 7/2005 | Lipton et al. | |
| 2005/0162515 A1 | 7/2005 | Venetianer et al. | |
| 2005/0189411 A1 | 9/2005 | Ostrowski et al. | |
| 2005/0265582 A1 * | 12/2005 | Buehler et al. | 382/103 |
| 2006/0104479 A1 * | 5/2006 | Bonch-Osmolovskiy et al. | 382/103 |
| 2006/0243798 A1 * | 11/2006 | Kundu et al. | 235/383 |
| 2006/0251324 A1 | 11/2006 | Bachmann et al. | |
| 2006/0283943 A1 | 12/2006 | Ostrowski et al. | |
| 2007/0058040 A1 | 3/2007 | Zhang et al. | |
| 2007/0182818 A1 | 8/2007 | Buehler | |
| 2007/0272734 A1 * | 11/2007 | Lipton et al. | 235/375 |
| 2007/0278298 A1 * | 12/2007 | Ali | 235/383 |
| 2008/0006698 A1 | 1/2008 | Kotlarsky et al. | |
| 2008/0243626 A1 * | 10/2008 | Stawar et al. | 705/23 |
| 2009/0026255 A1 * | 1/2009 | Besecker et al. | 235/375 |
| 2009/0026269 A1 * | 1/2009 | Connell et al. | 235/462.41 |
| 2009/0222354 A1 * | 9/2009 | Murphy et al. | 705/21 |
| 2009/0290802 A1 | 11/2009 | Hua et al. | |
| 2010/0013931 A1 * | 1/2010 | Golan et al. | 348/150 |
| 2010/0059589 A1 * | 3/2010 | Goncalves et al. | 235/383 |
| 2010/0086200 A1 | 4/2010 | Stankiewicz et al. | |
| 2010/0114617 A1 * | 5/2010 | Bobbitt et al. | 705/7 |
| 2010/0114623 A1 | 5/2010 | Bobbitt et al. | |
| 2011/0320296 A1 * | 12/2011 | Edwards | 705/23 |
| 2012/0188377 A1 * | 7/2012 | Kundu et al. | 348/150 |
| 2013/0004090 A1 * | 1/2013 | Kundu et al. | 382/232 |
| 2013/0018741 A1 | 1/2013 | Ostrowski et al. | |

OTHER PUBLICATIONS

Bobick, et al., "The recognition of human movement using temporal templates," IEEE PAMI, vol. 23, pp. 257-267, 2001.

Efros, et al., "Recognizing action at a distance," in ICCV03, 2003, pp. 726-733.

Urtasun, et al., "Priors for people tracking from small training sets," in ICCV05, 2005, pp. 403-410.

Shi, et al., "Propagation networks for recognition of partially ordered sequential action," in CVPR04, 2004, pp. 862-869.

Laxton, et al. "Leveraging temporal, contextual and ordering constraingt for recognizing complex activities," in CVPR07, 2007.

Laptev, et al., "Space-time interest points," in ICCV, 2003, pp. 432-439.

Ke, et al., "Efficient visual event detection using volumetric features," in ICCV05, 2005.

Dollar, et al., "Behavior recognition via sparse spatio-temporal features," in Visual Surveillance and Performance Evaluation of Tracking and Surveillance, 2005. 2nd joint IEEE International Workshop on, 2005, pp. 65-72.

D. G. Lowe, "Distinctive image features from scale-invariant keypoints," IJCV04, vol. 60, pp. 91-110, 2004.

Filipovych, et al., "Recognizing primitive interactions by exploring actor-object states," in CVPR08, 2008.

Marszalek, et al., "Learning realistic human actions from movies," in CVPR08, 2008.

Duong, et al., "Activity recognition and abnormality detection with the switching hidden semi-markov model," in CVPR05, 2005, pp. 1709-1718.

Ryoo, et. al., "Recognition of composite human activities through context-free grammar based representation," in CVPR, 2006, pp. 1709-1718.

Andrews, et al., "Multiple instance learning with generalized support vector machines," Artificial Intelligence, pp. 943-944, 2002.

* cited by examiner

Algorithm 1 Motion-based Segmentation

Require: Motion sequences of pickup, scan and drop
/*LEN(s) - temporal length of a segment*/
/*PEAK(s) - motion peak in a segment*/
Segment the scan motion by thresholding it by $S_{cutoff}$, and locate the motion peak in each scan event;
Partition the pickup (or drop) motion by the scan motion peaks identified above;
for each pickup (or drop) segment $s$ do
    Cut off $s$ over some threshold $E_{cutoff}$;
    for each resulting sub-segment $e$ of $s$ do
        if $LEN(e) > T_{threshold}$ and $PEAK(s) > P_{threshold}$ then
            Search for desired pattern (i.e. a bi-peak or single peak alone), and if found, report it as an event candidate;
        end if
    end for
end for

DETECTING PRIMITIVE EVENTS AT CHECKOUT

CROSS-REFERENCE TO RELATED APPLICATIONS

The present application is related to U.S. patent application Ser. No. 12/325,176 entitled "Analyzing Repetitive Sequential Events," and filed concurrently herewith, the disclosure of which is incorporated by reference herein in its entirety.

Additionally, the present application is related to U.S. patent application Ser. No. 12/325,178 entitled "Location-Aware Event Detection," and filed concurrently herewith, the disclosure of which is incorporated by reference herein in its entirety.

The present application is related to U.S. patent application entitled "Automatically Calibrating Regions of Interest for Video Surveillance," identified by Ser. No. 12/262,446, and filed on Oct. 31, 2008, the disclosure of which is incorporated by reference herein in its entirety.

Also, the present application is related to U.S. patent application entitled "Generating an Alert Based on Absence of a Given Person in a Transaction," identified by Ser. No. 12/262,454, and filed on Oct. 31, 2008, the disclosure of which is incorporated by reference herein in its entirety.

The present application is related to U.S. patent application entitled "Using Detailed Process Information at a Point of Sale," identified by Ser. No. 12/262,458, and filed on Oct. 31, 2008, the disclosure of which is incorporated by reference herein in its entirety.

Additionally, the present application is related to U.S. patent application entitled "Creating a Training Tool," identified by Ser. No. 12/262,467, and filed on Oct. 31, 2008, the disclosure of which is incorporated by reference herein in its entirety.

FIELD OF THE INVENTION

Embodiments of the invention generally relate to information technology, and, more particularly, to retail loss prevention.

BACKGROUND OF THE INVENTION

Detecting primitive events (for example, at a checkout) is advantageous for many applications in retail vectors (for example, loss prevention). Existing approaches include manual marking, but such approaches are expensive, time-consuming, error-prone and not scalable. Other approaches include event learning techniques that use visual information, but disadvantageously require annotation for training and may not be in real-time. Existing approaches also include using physical sensors. However, such approaches are limited to specific domains (for example, weight, height, etc.) and sensors can be expensive.

SUMMARY OF THE INVENTION

Principles and embodiments of the invention provide techniques for detecting primitive events (for example, at a retail checkout). An exemplary method (which may be computer-implemented) for detecting one or more events, according to one aspect of the invention, can include steps of identifying one or more segments in a video sequence as one or more candidates for one or more events by a temporal ordering of the one or more candidates, and analyzing one or more motion patterns of the one or more candidates to detect the one or more events.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

One or more embodiments of the invention divide a transaction area into three parts: the lead-in belt area where a customer unloads the products, the scan area where a barcode reader (or scanner) is installed, and the take-away belt area where scanned products are deposited. A complete process to transact one item at the point-of-sale (POS) is referred to herein as a visual scan. A visual scan usually includes three major operations from the cashier: picking up a product from the lead-in belt, presenting the product to the scanner (or weighing the product if it has no bar code) for registration and then depositing (or dropping) the product onto the take-away belt for bagging. These three operations are referred to herein as pickup, scan and drop, respectively. These operations are the primary primitive events (or primitives), as described herein.

Principles of the invention include detecting primitives (for example, a pickup, scan and drop at a retail checkout station). As described herein, one or more embodiments of the invention include using motion from frame differencing, exploring motion patterns for different primitive events, and using the temporal ordering of primitive events. Different primitive events present different motion patterns. As such, the techniques described herein detect primitive events by analyzing their motion patterns. Also, one or more embodiments of the invention use the relationships between primitive events to improve detection performance.

The techniques described herein can be implemented, for example, in a simple and efficient real-time surveillance system. One or more embodiments of the invention use cross-identification (for example, using motion in the scan area to help identify candidates for primitive events such as pickup and drop events and vice-versa. The candidates can be further validated by more sophisticated event recognition algorithms. Also, in addition to pickup, scan and drop, one or more embodiments of the invention can be extended to detect other types of primitive events (for example, casher's key-in operation at checkout).

Often, the motion generated by a pickup or drop event can include the following properties. There are two local maxima with one local minimum in between. Also, for a pickup, the first maximum is smaller than the second one, and vice-versa for a drop. The motion minimum of the pickup or drop event can be caused by the short pause of the hand while the difference between two maxima often corresponds with the motion created by the product. One or more embodiments of the invention also use the relationships between primitive events to improve detection performance. This can be based on the fact that a pickup or drop occurs between two consecutive scans and a scan happens between a pickup and a drop.

As described herein, one or more embodiments of the invention include computing the motion map by frame differencing. For each region of interest, one can count the motion pixels for each frame in the lead-in belt, scan and take-away belt areas. The techniques described herein utilize the fact that a pickup or drop occurs between two consecutive scans. The motion in the scan area can be roughly segmented by a threshold value, and the motion peak can be found for each segment. For the time period between any two consecutive scan motion peaks, one can find a sub-segment in the pickup (or drop) motion that indicates the expected pattern for pickup (or drop). The detected pickup and drop events can, in turn, be used to help reduce false positives in the scan detection.

One or more embodiments of the invention include developing an efficient (real-time) algorithm for detecting primitive events (cashiers' operations) at a point-of-sale (POS). The detection results can be further improved by more sophisticated event models and used for inferring cashiers' suspicious activity.

Further, as described herein, one or more embodiments of the invention identify segments in a video sequence as candidates for primitive events at a POS by, for example, using a motion-based segmentation algorithm. The algorithm locates motion peaks in the scan region, which are used to distinguish events in the adjacent regions. The separated event segments are refined by thresholding, with temporal length, magnitude of motion and motion patterns taken into account as well.

As noted above, the techniques described herein can include segmentation of video sequences. To detect when events occur in a video sequence, one can, for example, apply a sliding window in time with a fixed scale (or multiple windows with varied scales). However, this technique is inefficient, and determining the scale (or scales) is non-trivial in many cases. As a result, one or more embodiments of the invention use an efficient technique to segment the video sequence and identify good candidates for primitives. The candidates can be further verified by more advanced event recognition algorithms.

The three primitives of interest can be simulated as an "in/out" process in which a hand or both hands enter and then exit a region quickly. One or more embodiments of the invention place a region of interest (ROI) for each primitive in the lead-in belt, scan and take-away belt areas to capture this process. The motion pixels obtained by frame differencing are counted in each ROI for each frame and normalized by the area of the ROI. As such, patterns may present themselves in the resulting motion sequences. For example, many of the pickup (or drop) events may display two peaks with a valley in-between, which faithfully depict the motion change caused by the interaction between the hand(s) and the specified region during an event. The valley corresponds to the moment of a short pause when the hand is about to reach an item (pickup) or to retrieve an item (drop). Note that the locations of the two peaks roughly correspond to the start and end time of an event. However, the valley is not always present if the hand moves too fast without pause, instead usually leading to a pattern of a single peak.

While the patterns indicated by the primitive events are visually identifiable, the temporal ordering of the events provides useful hints to segment them in the motion sequence. Pickup, scan and drop occur sequentially, suggesting that there is one pickup (and drop) between two consecutive scans. As such, one or more embodiments of the invention first identify scan events by thresholding the scan motion. The motion peak for each scan is located and used as a divider to separate pickup and drop events. For each pre-segmented event, one or more embodiments of the invention can further cut-off the motion sequence over a threshold, and assess the resulting sub-segment(s) with regard to duration, magnitude and motion patterns.

Figure 1A:
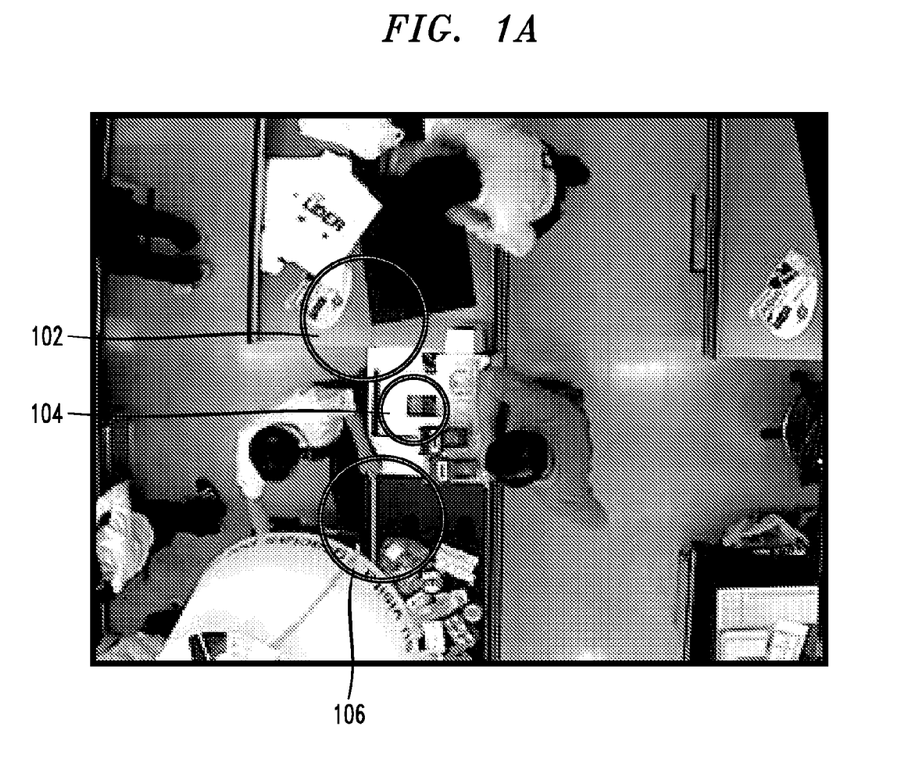
FIG. 1A is a diagram illustrating regions of interest (ROIs) at a retail checkout, according to an embodiment of the present invention.

FIG. 1A is a diagram illustrating regions of interest (ROIs) placed at a retail checkout station, according to an embodiment of the present invention. By way of illustration, FIG. 1A depicts ROIs in the lead-in belt area 106, scan area 104 and take-away belt area 102. In addition, one or more embodiments of the invention include counting the motion pixels in each region for each frame.

Figure 1B:
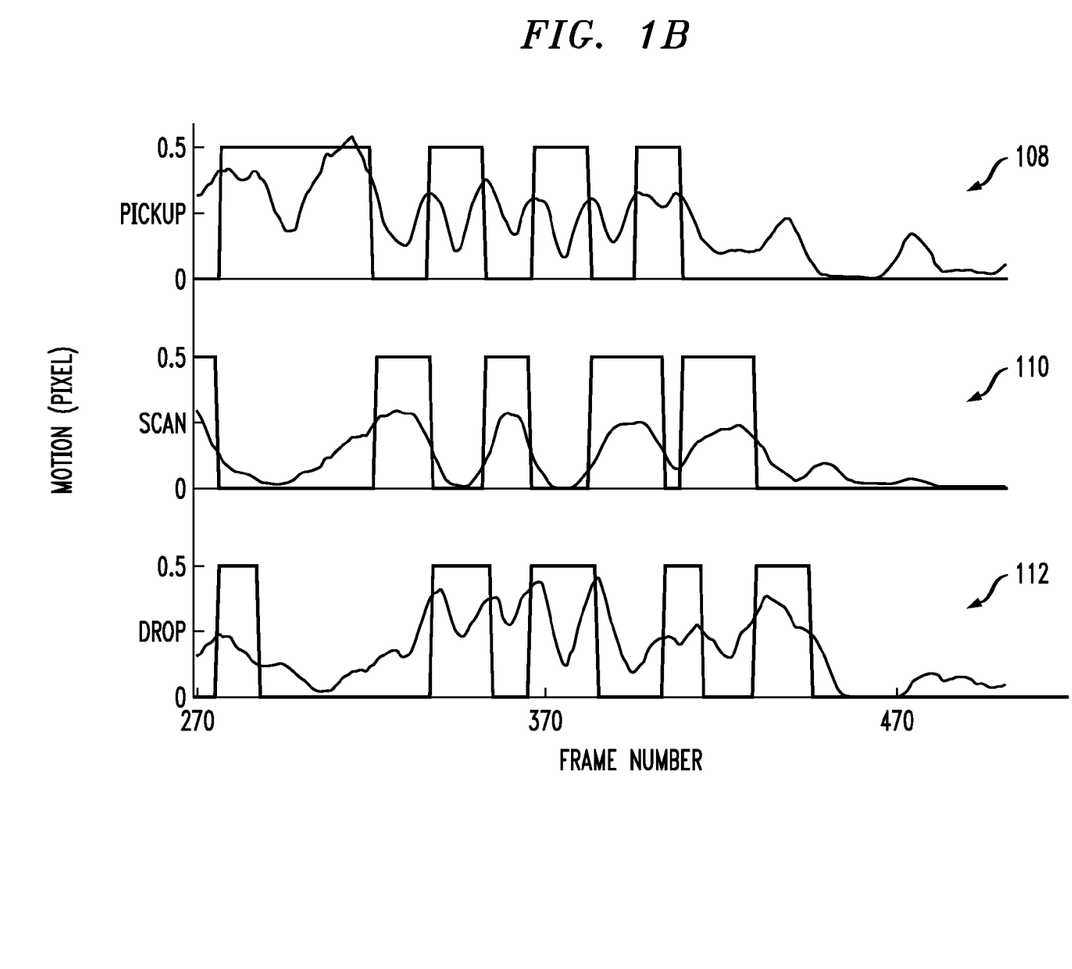
FIG. 1B is a diagram illustrating motion sequences of pickup, scan and drop, according to an embodiment of the present invention.

FIG. 1B is a diagram illustrating motion sequences of pickup, scan and drop, according to an embodiment of the present invention. By way of illustration, FIG. 1B depicts a pickup motion graph 108, a scan motion graph 110 and a drop motion graph 112. As illustrated in FIG. 1B, the boxes indicate ground truth (that is, the start time and end time of a primitive). For pickup 108 and drop 112 events, the typical motion patterns are bi-peak or a single peak. For scan 110 events, the patterns are mostly a single peak.

Figure 2:
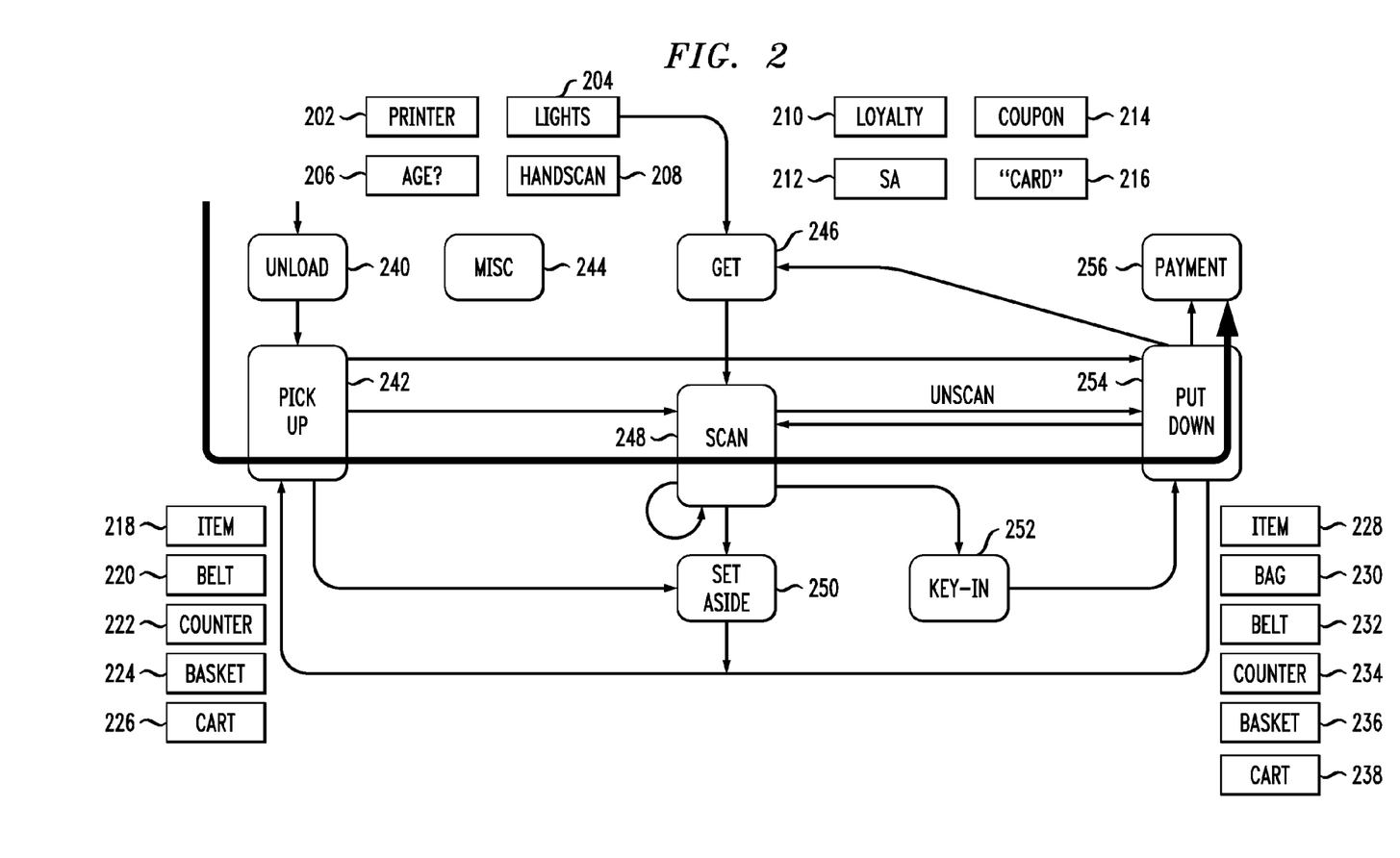
FIG. 2 is a diagram illustrating an exemplary retail checkout progression, according to an embodiment of the present invention.

FIG. 2 is a diagram illustrating an exemplary retail checkout progression, according to an embodiment of the present invention. By way of illustration, FIG. 2 depicts components such as a printer 202, lights 204, an age verification element 206, a hand-scan 208 and other miscellaneous elements 244 (for example, a hard-tag remover (often in apparel stores), a demagnetizer (high-end electronics stores), a radio-frequency identification (RFID) receiver, etc.). Also, at the beginning of the progression, a customer may unload in step 240 an item 218 onto a belt 220 or counter 222 from his or her basket 224 or cart 226, and a cashier or employee may pickup in step 242 the item 218 from the belt 220 or counter 220. The cashier or employee, at this stage, may also set aside an item in step 250.

Additionally, the cashier or employee, in step 246, may get a loyalty item 210, a shopper assistant (SA) card 212 (used, for example, in stores with self-checkout lanes), a coupon 214 and/or one or more types of cards 216 from the customer. The cashier or employee can also scan an item in step 248 and/or key-in information into the register in step 252. Further, in step 254, the cashier or employee can put down an item 228 onto a belt 232 or counter 234, and/or into a bag 230, a basket 236 and/or cart 238. Also, the cashier or employee can seek payment from the customer in step 256.

Figure 3:
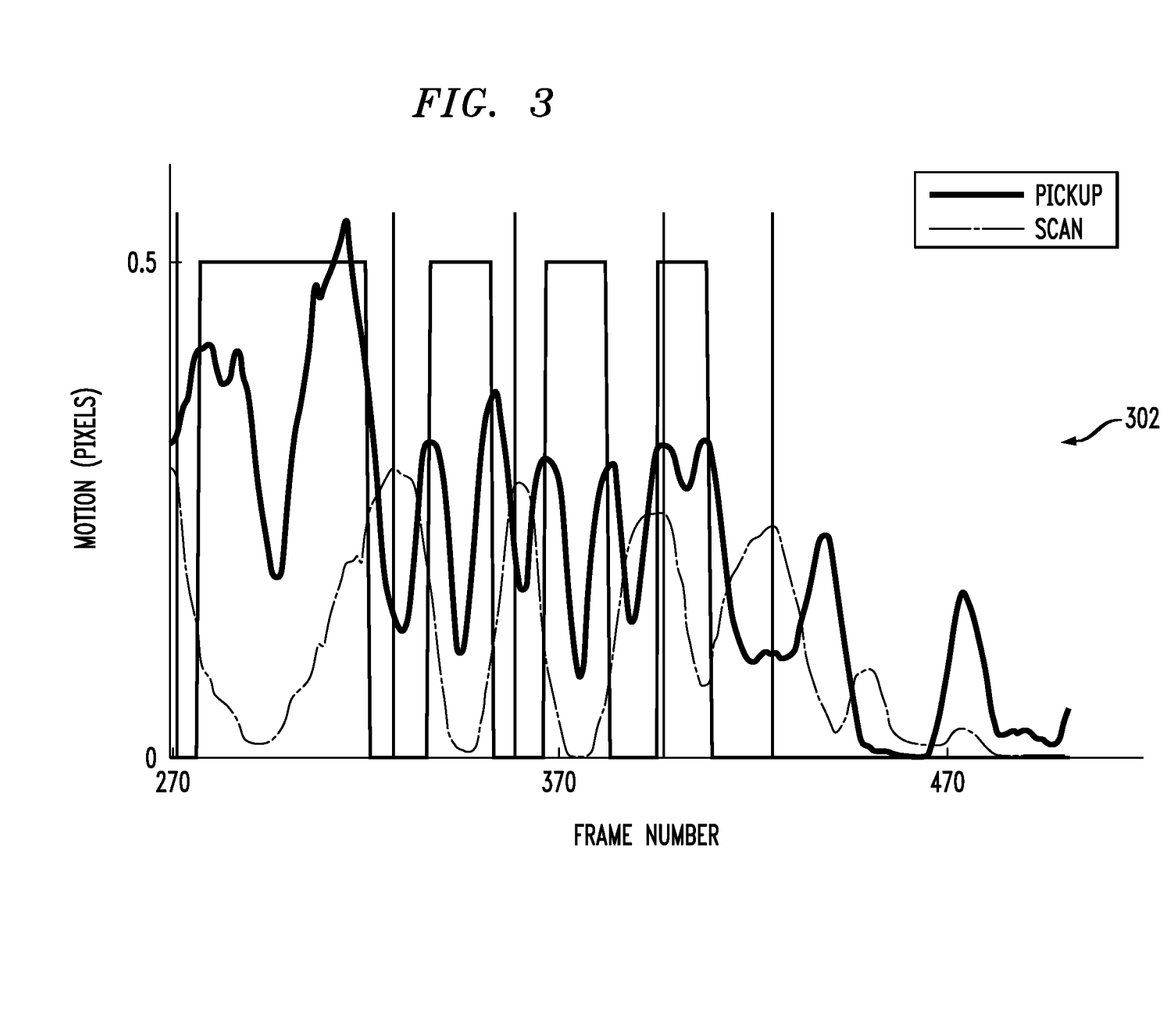
FIG. 3 is a diagram illustrating motion sequences, according to an embodiment of the present invention.

FIG. 3 is a diagram illustrating motion sequences, according to an embodiment of the present invention. By way of illustration, FIG. 3 depicts a motion sequence graph 302. The motion in the scan area (that is, the dotted line) is superimposed on the motion in the lead-in belt area (that is, the bold line). The boxes are ground truth for pickup events. By observation, there is one drop between two consecutive scans. In one or more embodiments of the invention, one can utilize this fact to segment the drop motion by first identifying motion peaks in the scan area.

Figure 4:
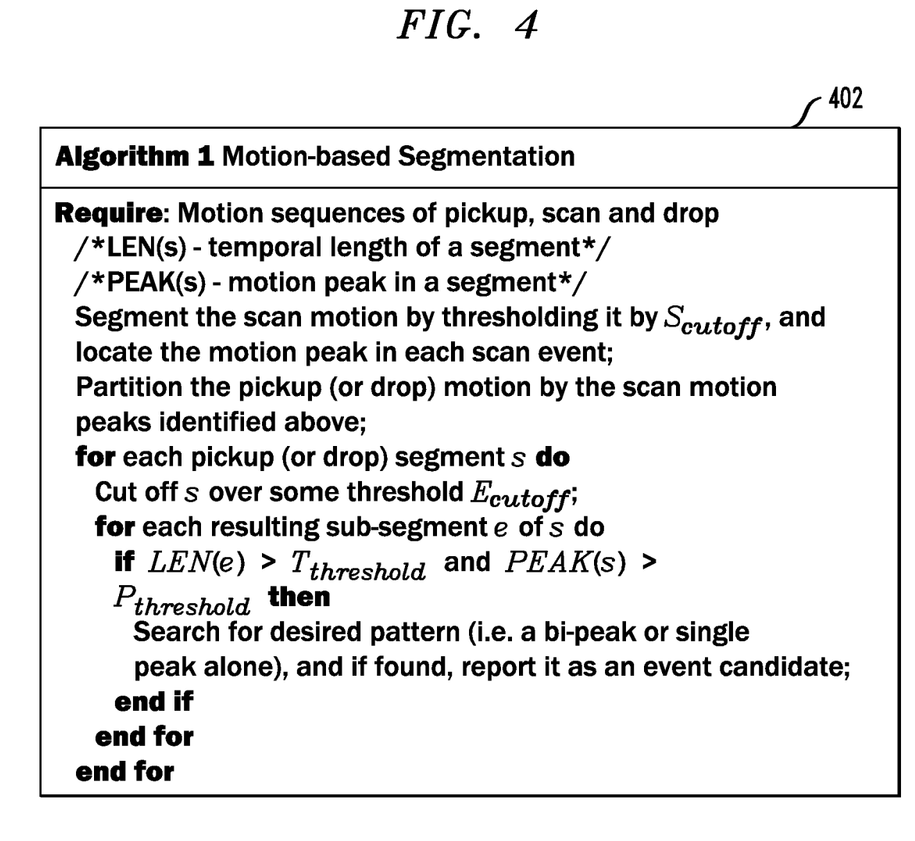
FIG. 4 is a diagram illustrating a segmentation algorithm, according to an embodiment of the present invention.

FIG. 4 is a diagram illustrating a segmentation algorithm 402, according to an embodiment of the present invention. As described herein, one or more embodiments of the invention use a motion sequence in a scan area to pre-segment the motion sequence in adjacent areas, and use the motion patterns displayed in the primitive events to further identify primitives of interest.

As described herein, one or more embodiments of the invention can include techniques such as the following. For example, one can compute a motion map for each frame by frame differencing, as well as count the motion pixels in each ROI for each frame. Additionally, one can segment scan motion by a threshold value to determine the motion peak for each segment.

For the time period between any two consecutive scan motion peaks, one can segment the pickup (or drop) motion by a threshold value. One or more embodiments of the invention check each sub-segment to determine all of those with the expected pattern for pickup (or drop). If there are more than one sub-segment found, one can report the one that is closest to the first scan motion peak, and if there is no sub-segment found, one can report the one with the highest motion peak. Additionally, the detected scan and pickup events can, in turn, be used to remove false positives of the scan events.

Figure 5:
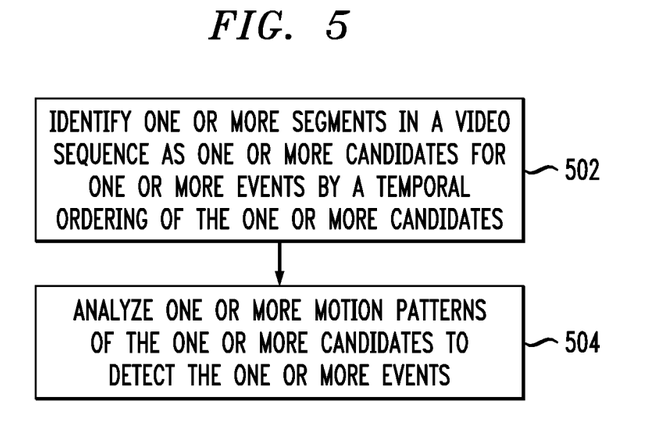
FIG. 5 is a flow diagram illustrating techniques for detecting one or more events, according to an embodiment of the present invention.

FIG. 5 is a flow diagram illustrating techniques for detecting one or more events (for example, one or more primitive events), according to an embodiment of the present invention. Step 502 includes identifying one or more segments in a video sequence as one or more candidates for one or more events by a temporal ordering of the one or more candidates (for example, one or more primitive events at a POS). The segments can be refined, for example, by thresholding, wherein thresholding uses temporal length, magnitude of motion and motion patterns.

Additionally, the events can include events at a point of sale such as, for example, a pickup, a scan and a drop, wherein a pickup includes a cashier picking up an item, a scan includes a cashier at least one of reading an item via a scanner and/or weighing an item, and a drop includes a cashier placing an item onto the take-away belt area.

Identifying segments in a video sequence as candidates for events can include, for example, using motion from frame differencing. Also, identifying segments in a video sequence as candidates for events can include locating one or more motion peaks in a region and using the motion peaks in the region to distinguish events in adjacent regions.

Step 504 includes analyzing one or more motion patterns of the one or more candidates to detect the one or more events. Analyzing motion patterns of the candidates can include counting motion pixels obtained by frame differencing in each segment for each frame (one can also, for example, normalize the each segment by the area of the region of interest).

One or more embodiments of the invention can also include using the one or more motion patterns and a temporal ordering of the one or more events to detect the one or more events. Using the motion patterns and a temporal ordering of the events to detect the events can include, for example, analyzing the candidates to determine the candidates with an expected pattern for one or more events. Also, using the motion patterns and a temporal ordering of the events to detect the events can include combining one or more events according to temporal ordering constraints to validate a transaction process.

The techniques depicted in FIG. 5 can also include using relationships between one or more events to improve detection performance.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
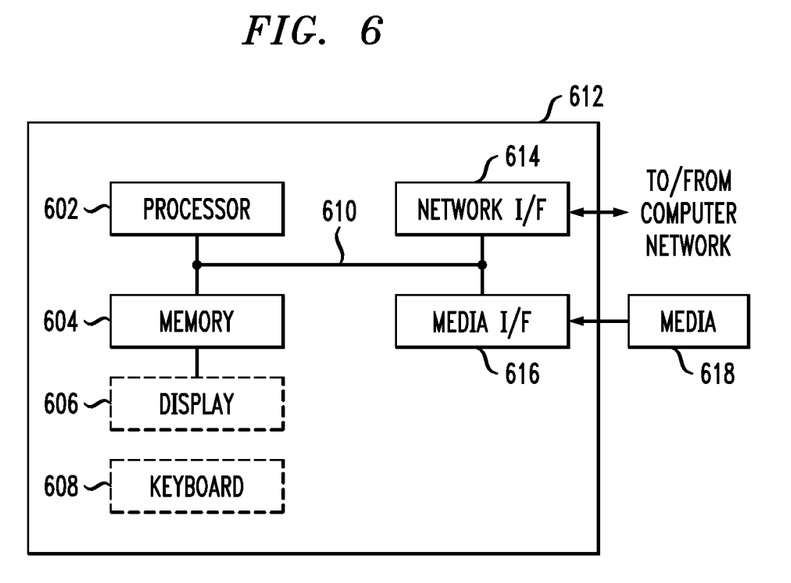
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, detecting primitive events by analyzing their motion patterns.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for detecting one or more events, comprising:
generating a motion graph from a video sequence captured at a point-of-sale (POS) system, the motion graph representing human motion in the video sequence;
detecting two consecutive scan events at the POS system by identifying a first reference motion pattern in the motion graph;
identifying a segment of the video sequence between the two consecutive scan events; and
upon identifying the video sequence segment, analyzing a portion of the motion graph corresponding to the video sequence segment to detect at least one of a pick-up event and a drop event by identifying a second reference motion pattern in the motion graph.

2. The method of claim 1,
wherein the first motion pattern corresponds to one or more motion peaks in the motion graph.

3. The method of claim 1, wherein analyzing the video sequence segment to detect at least one of a pick-up event and a drop event comprises:
detecting the second motion pattern using a portion of the motion graph corresponding to the video sequence segment, wherein the second motion pattern corresponds to a motion valley flanked by two motion peaks in the motion graph.

4. The method of claim 1, wherein the motion graph comprises three portions each associated with three regions of interest included within the video sequence, each region of interest corresponding to the scan, pick-up, and drop events, respectively,
wherein monitoring the video sequence to detect two consecutive scan events comprises identifying the two consecutive scan events by monitoring the portion of the motion graph associated with the region of interest of the scan event,
wherein analyzing the video sequence segment comprises analyzing the portion of the motion graph corresponding to at least one of the pick-up event and drop event.

5. The method of claim 1, wherein the pick-up event comprises a cashier picking up an item from a lead-in portion of the POS system, the scan event comprises the cashier at least one of reading the item via a scanner and weighing the item, and the drop event comprises the cashier placing the item onto a take-away portion of the POS system.

6. The method of claim 1, wherein generating the motion graph based on the human motion comprises counting one or more motion pixels obtained by frame differencing the video sequence.

7. The method of claim 1, further comprising, upon detecting the pick-up or drop event, combining one or more of the consecutive scan events and the pick-up or drop event according to one or more temporal ordering constraints to validate a transaction process of the POS system.

8. The method of claim 1, wherein the two consecutive scan events are detected by determining whether a cashier's motion exceeds a threshold of motion.

9. A computer program product comprising a computer readable device having computer readable program code for detecting one or more events, said computer program product including:
computer readable program code for generating a motion graph from a video sequence captured at a point-of-sale (POS) system, the motion graph representing human motion in the video sequence;
computer readable program code for detecting two consecutive scan events at the POS system by identifying a first reference motion pattern in the motion graph;
computer readable program code for identifying a segment of the video sequence between the two consecutive scan events; and
computer readable program code for, upon identifying the video sequence segment, analyzing a portion of the motion graph corresponding to the video sequence segment to detect at least one of a pick-up event and a drop event at the POS system by identifying a second reference motion pattern in the motion graph.

10. The computer program product of claim 9, wherein the first motion pattern corresponds to one or more motion peaks in the motion graph.

11. The computer program product of claim 9, wherein analyzing the video sequence segment to detect at least one of a pick-up event and a drop event comprises:
computer readable program code for detecting the second motion pattern using a portion of the motion graph corresponding to the video sequence segment, wherein the second motion pattern corresponds to a motion valley flanked by two motion peaks in the motion graph.

12. The computer program product of claim 9, wherein the motion graph comprises three portions each associated with three regions of interest included within the video sequence, each region of interest corresponding to the scan, pick-up, and drop events, respectively,
wherein monitoring the video sequence to detect two consecutive scan events comprises identifying the two consecutive scan events by monitoring the portion of the motion graph associated with the region of interest of the scan event,
wherein analyzing the video sequence segment comprises analyzing the portion of the motion graph corresponding to at least one of the pick-up event and drop event.

13. The computer program product of claim 9, wherein the pick-up event comprises a cashier picking up an item from a lead-in portion of the POS system, the scan event comprises the cashier at least one of reading the item via a scanner and weighing the item, and the drop event comprises the cashier placing the item onto a take-away portion of the POS system.

14. The computer program product of claim 9, further comprising, computer readable program code for, upon detecting the pick-up or drop event, combining one or more of the consecutive scan events and the pick-up or drop event according to one or more temporal ordering constraints to validate a transaction process of the POS system.

15. A system for detecting one or more events, comprising:
a computer processor; and
a memory containing a program that, when executed on the computer processor, performs an operation for processing data, comprising:
generating a motion graph from a video sequence captured at a point-of-sale (POS) system, the motion graph representing human motion in the video sequence;
detecting two consecutive scan events at the POS system by identifying a first reference motion pattern in the motion graph;
identifying a segment of the video sequence between the two consecutive scan events; and
upon identifying the video sequence segment, analyzing a portion of the motion graph corresponding to the video sequence segment to detect at least one of a pick-up event and a drop event by identifying a second reference motion pattern in the motion graph.

16. The system of claim 15, wherein
wherein the first motion pattern corresponds to one or more motion peaks in the motion graph.

17. The system of claim 15, wherein analyzing the video sequence segment to detect at least one of a pick-up event and a drop event comprises:
detecting the second motion pattern using a portion of the motion graph corresponding to the video sequence segment, wherein the second motion pattern corresponds to a motion valley flanked by two motion peaks in the motion graph.

18. The system of claim 15, wherein the motion graph comprises three portions each associated with three regions of interest included within the video sequence, each region of interest corresponding to the scan, pick-up, and drop events, respectively,
wherein monitoring the video sequence to detect two consecutive scan events comprises identifying the two consecutive scan events by monitoring the portion of the motion graph associated with the region of interest of the scan event,
wherein analyzing the video sequence segment comprises analyzing the portion of the motion graph corresponding to at least one of the pick-up event and drop event.

19. The system of claim 15, wherein the pick-up event comprises a cashier picking up an item from a lead-in portion of the POS system, the scan event comprises the cashier at least one of reading the item via a scanner and weighing the item, and the drop event comprises the cashier placing the item onto a take-away portion of the POS system.

20. The system of claim 15, the operation further comprising, upon detecting the pick-up or drop event, combining one or more of the consecutive scan events and the pick-up or drop event according to one or more temporal ordering constraints to validate a transaction process of the POS system.

21. An apparatus for detecting one or more events, said apparatus comprising:
means for generating a motion graph from a video sequence captured at a point-of-sale (POS) system, the motion graph representing human motion in the video sequence;
means for detecting two consecutive scan events at the POS system by identifying a first reference motion pattern in the motion graph;
means for identifying a segment of the video sequence between the two consecutive scan events; and
means for, upon identifying the video sequence segment, analyzing a portion of the motion graph corresponding to the video sequence segment to detect at least one of a pick-up event and a drop event by identifying a second reference motion pattern in the motion graph.

* * * * *